(12) United States Patent
Huang et al.

(10) Patent No.: US 11,437,692 B2
(45) Date of Patent: Sep. 6, 2022

(54) COAXIAL CABLE AND CABLE ASSEMBLY

(71) Applicant: Hitachi Metals, Ltd., Tokyo (JP)

(72) Inventors: Detian Huang, Tokyo (JP); Takanobu Watanabe, Tokyo (JP); Hideki Nonen, Tokyo (JP); Masashi Arai, Tokyo (JP); Hiromitsu Kuroda, Tokyo (JP); Ryohei Okada, Tokyo (JP); Tamotsu Sakurai, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 17/236,771

(22) Filed: Apr. 21, 2021

(65) Prior Publication Data

US 2021/0399396 A1    Dec. 23, 2021

(30) Foreign Application Priority Data

Jun. 18, 2020  (JP) .............................. JP2020-105218
Feb. 2, 2021   (JP) .............................. JP2021-015262

(51) Int. Cl.
*H01P 3/06*     (2006.01)

(52) U.S. Cl.
CPC ..................................... *H01P 3/06* (2013.01)

(58) Field of Classification Search
CPC ........ H01Q 5/335; H01Q 23/00; H01P 3/023; H01P 3/081; H01P 3/06; H01B 11/20; H01B 11/06; H01B 7/02; H01B 11/1808
See application file for complete search history.

(56) References Cited

FOREIGN PATENT DOCUMENTS

| JP | H06-203664 A | 7/1994 |
|---|---|---|
| JP | 2701105 B2 * | 1/1998 |
| JP | 2000-285747 A | 10/2000 |
| JP | 2003-045244 A | 2/2003 |
| JP | 2003045244 A * | 2/2003 |
| JP | 2010-153191 A | 7/2010 |
| JP | 2014-191884 A | 10/2014 |
| JP | 2019-061776 A | 4/2019 |

OTHER PUBLICATIONS

Japanese Office Action, dated May 18, 2021, in Japanese Application No. 2021-015262 and English Translation thereof.
Japanese Office Action, dated Oct. 12, 2021, in Japanese Application No. 2021-015262 and English Translation thereof.

* cited by examiner

*Primary Examiner* — Stephen E. Jones
*Assistant Examiner* — Kimberly E Glenn
(74) *Attorney, Agent, or Firm* — McGinn IP Law Group, PLLC

(57) ABSTRACT

A coaxial cable is composed of a conductor, an electrical insulating member covering a periphery of the conductor, a shield layer covering a periphery of the electrical insulating member, and a sheath covering a periphery of the shield layer. The shield layer is configured to include a lateral winding shielding portion with a plurality of metal wires being helically wrapped around the periphery of the electrical insulating member, and a batch plating portion made of a hot-dip plating covering respective peripheries of the lateral winding shielding portion. The shield layer includes an outer peripheral portion, in which the metal wires are covered with the batch plating portion, and an inner peripheral portion, in which the metal wires are not covered with the batch plating portion. The outer peripheral portion of the shield layer includes intermetallic compounds between the metal wires and the batch plating portion.

5 Claims, 7 Drawing Sheets

COAXIAL CABLE AND CABLE ASSEMBLY

CROSS-REFERENCE TO RELATED APPLICATION

The present application is based on Japanese patent application No. 2020-105218 filed on Jun. 18, 2020 and Japanese patent application No. 2021-015262 filed on Feb. 2, 2021, the entire contents of which are incorporated herein by reference.

BACKGROUND OF THE INVENTION

1. Field of the Invention

The present invention relates to a coaxial cable and a cable assembly.

2. Description of the Related Art

A coaxial cable is used as a cable designed to carry out a high frequency signal transmission and to be used as an internal wiring in an image recording device to be used in an automatic operation or the like, or as an internal wiring in an electronic device such as a smartphone or a tablet terminal or the like, or as a wiring in a machine tool such as an industrial robot or the like.

As the conventional coaxial cable, there is known one with a shield layer being configured in such a manner that a taping member such as a copper tape or the like provided with a copper foil on a resin layer is helically wrapped around a periphery of an electrical insulating member (see, e.g., JP2000-285747A).

[Patent Document 1] JP2000-285747A

SUMMARY OF THE INVENTION

However, in the conventional coaxial cable described above, there is a problem with a phenomenon called "suck-out" occurring, which refers to a rapid attenuation caused in a predetermined frequency band (e.g., a band of several GHz such as 1.25 GHz or the like).

On the other hand, for example, by configuring the shield layer in such a manner that the outer surface of the electrical insulating member is subjected to a plating, it is possible to suppress the occurrence of the suck-out. However, when the coaxial cable has been repeatedly bent, a crack formation in its shield layer made of the plating has occurred or a peeling off of that shield layer made of the plating from the outer surface of the electrical insulating member has occurred. The occurrence of the crack formation in its shield layer made of the plating or the peeling off of that shield layer made of the plating from the outer surface of the electrical insulating member has led to a degradation in the shielding effect. That is, the shielding effect of the shield layer on the noise caused in the coaxial cable has been degraded.

In light of the foregoing, it is an object of the present invention to provide a coaxial cable, and a cable assembly, which are designed to be resistant to the occurrence of a degradation in the shielding effect, and to be resistant to the occurrence of a rapid attenuation in a predetermined frequency band.

For the purpose of solving the aforementioned problems, the present invention provides a coaxial cable, comprising:

a conductor;

an electrical insulating member covering a periphery of the conductor;

a shield layer covering a periphery of the electrical insulating member; and a sheath covering a periphery of the shield layer, wherein the shield layer includes a lateral winding shielding portion comprising a plurality of metal wires being helically wrapped around the periphery of the electrical insulating member in such a manner as to cover the periphery of the electrical insulating member, and a batch plating portion comprising a hot dip plating, which is covering a periphery of the lateral winding shielding portion, wherein the shield layer includes an outer peripheral portion, in which the plurality of metal wires are covered with the batch plating portion, and an inner peripheral portion, in which the plurality of metal wires are not covered with the batch plating portion, wherein the outer peripheral portion of the shield layer includes an intermetallic compound between the plurality of metal wires and the batch plating portion.

Furthermore, for the purpose of solving the aforementioned problems, the present invention provides a cable assembly, comprising: the above defined coaxial cable; and a terminal member integrally provided to at least one end portion of the above defined coaxial cable.

Points of the Invention

According to the present invention, it is possible to provide the coaxial cable, and the cable assembly, which are designed to be resistant to the occurrence of a degradation in the shielding effect, and to be resistant to the occurrence of a rapid attenuation in a predetermined frequency band.

BRIEF DESCRIPTION OF THE DRAWINGS

Next, preferred embodiment according to the present invention will be described with reference to appended drawings, wherein.

DETAILED DESCRIPTION OF THE PREFERRED EMBODIMENTS

Embodiment

An embodiment of the present invention will be described below in conjunction with the accompanying drawings.

Figure 1A:
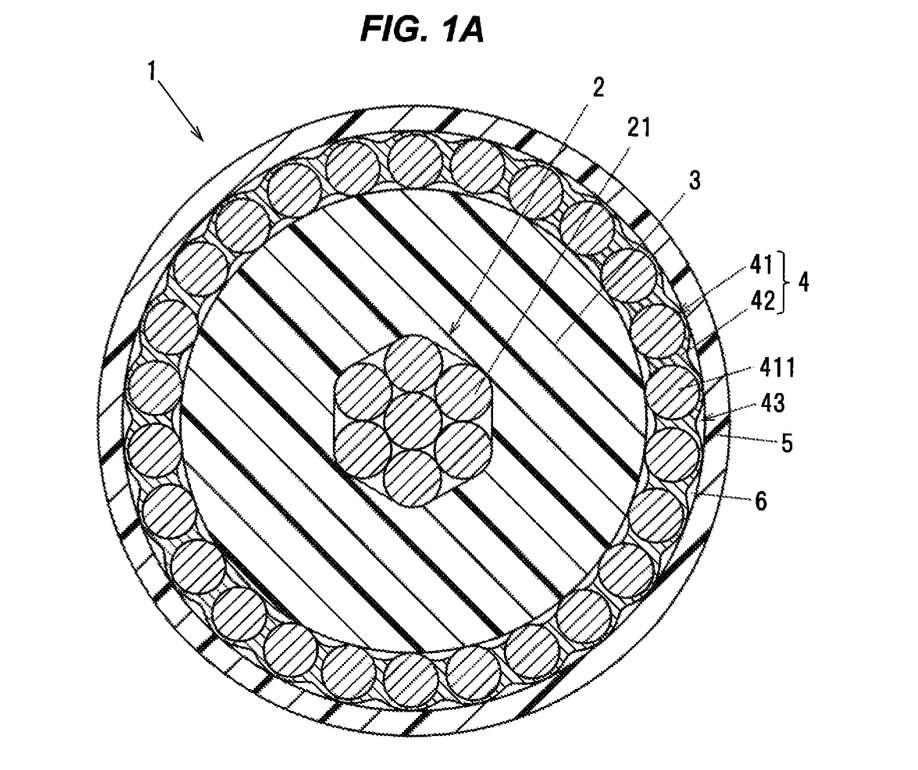
FIG. 1A is a cross-sectional view showing a cross section perpendicular to a longitudinal direction showing a coaxial cable according to one embodiment of the present invention.
Figure 1B:
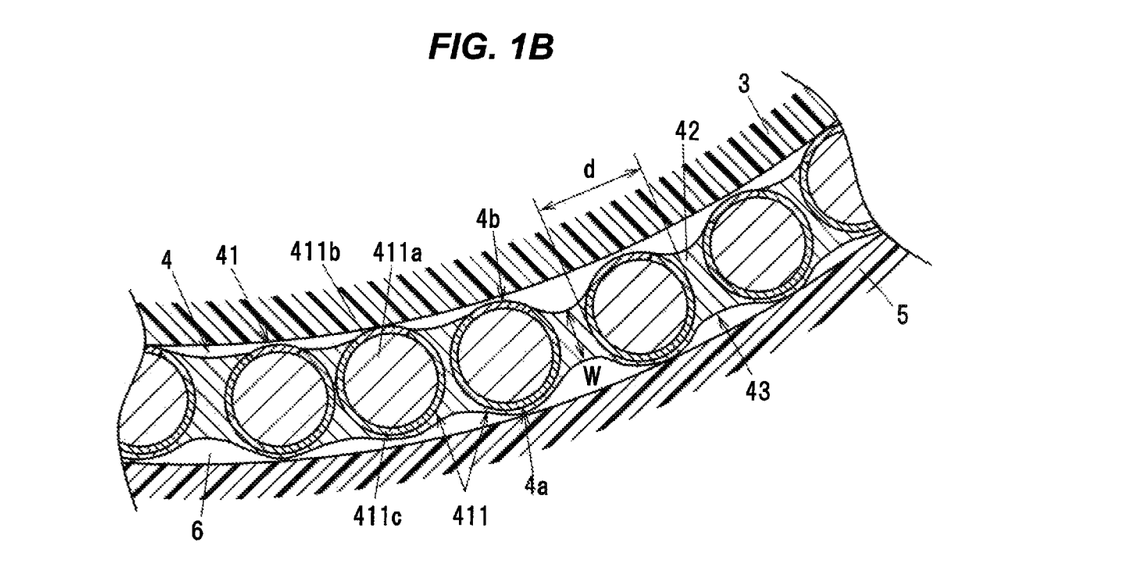
FIG. 1B is an enlarged view of an essential portion of the coaxial cable shown in FIG. 1A.

FIG. 1A is a cross-sectional view showing a cross section perpendicular to a longitudinal direction showing a coaxial cable 1 according to the present embodiment, and FIG. 1B is an enlarged view of an essential portion of the coaxial cable 1 shown in FIG. 1A.

As shown in FIGS. 1A and 1B, the coaxial cable 1 is including a conductor 2, an electrical insulating member 3, which is provided in such a manner as to cover a periphery of the conductor 2, and a shield layer 4, which is provided in such a manner as to cover a periphery of the electrical insulating member 3, and a sheath 5, which is provided in such a manner as to cover a periphery of the shield layer 4.

The conductor 2 is configured in such a manner as to be made of a stranded wire conductor, which is formed by stranding a plurality of metal wires 21, 21, . . . , 21 together. In the present embodiment, the conductor 2 formed by stranding seven of the metal wires 21, 21, . . . , 21 each made of an annealed copper wire of an outer diameter of 0.02 mm is used. The configuration of the conductor 2 is not limited to the foregoing, but the conductor 2 can also be configured in such a manner as to use a compressed stranded wire conductor, which is produced by stranding the plurality of metal wires 21, 21, . . . , 21 together, and subsequently subjecting the stranded metal wires 21, 21, . . . , 21 to a compression working in such a manner that the cross-sectional shape of the stranded metal wires 21, 21, . . . , 21, which is perpendicular to the longitudinal direction of the coaxial cable 1, becomes a circular shape. The use of the compressed stranded wire conductor as the conductor 2 allows the electrical conductivity of the conductor 2 to be enhanced, the good transmission property of the conductor 2 to be obtained, and the high bendability of the conductor 2 to be maintained. Further, the plurality of metal wires 21, 21, . . . , 21 may be configured in such a manner as to use a copper alloy wire including tin (Sn), silver (Ag), indium (In), titanium (Ti), magnesium (Mg), iron (Fe) or the like, from the point of view of enhancing the electrical conductivities and the mechanical strengths of the plurality of metal wires 21, 21, . . . , 21.

The electrical insulating member 3 is configured in such a manner as to be made of, e.g., PFA (perfluoro alkoxy alkane), or FEP (fluorinated ethylene tetrafluoride/propylene hexafluoride copolymer) fluoropolymer resin, polyethylene, polypropylene or the like. The electrical insulating member 3 may be configured in such a manner as to use a foamed resin, or may be configured with a crosslinked resin in order to enhance the heat resistance of the electrical insulating member 3. Further, the electrical insulating member 3 may be configured in such a manner as to have a multi-layer structure. For example, the electrical insulating member 3 can also be configured in such a manner as to have a three-layer structure composed of a first non-foamed layer made of non-foamed polyethylene, which is covering a periphery of the conductor 2, a foamed layer made of foamed polyethylene, which is covering a periphery of the first non-foamed layer, and a second non-foamed layer made of non-foamed polyethylene, which is covering a periphery of the foamed layer. In the present embodiment, the electrical insulating member 3 made of PFA is formed over the periphery of the conductor 2 by tube extrusion. By forming the electrical insulating member 3 over the periphery of the conductor 2 by the tube extrusion, the electrical insulating member 3 is easily peeled off from the conductor 2 during termination working, and the termination workability is therefore enhanced.

In the coaxial cable 1 according to the present embodiment, the shield layer 4 is including one or more lateral winding shielding portion(s) 41, which is formed by a plurality of metal wires 411, 411, . . . , 411 being helically wrapped around a periphery of the electrical insulating member 3, and an electrically conductive batch plating portion 42, which is provided in such a manner as to batch cover a periphery (or respective peripheries) of the lateral winding shielding portion(s) 41 together. Note that the shield layer 4 may be configured in such a manner that, with all of adjacent ones of the plurality of metal wires 411, 411, . . . , 411 in a circumferential direction of the coaxial cable 1 being brought into contact with each other, the batch plating portion 42 is provided in such a manner as to batch coat the periphery of the lateral winding shielding portion 41 together, or may be configured in such a manner that, with there being gaps between some of the adjacent ones of the plurality of metal wires 411, 411, . . . , 411 in the circumferential direction of the coaxial cable 1, the batch plating portion 42 is provided on the periphery of the lateral winding shielding portion 41 in such a manner as to fill the gaps between some of the adjacent ones of the plurality of metal wires 411, 411, . . . , 411 in the circumferential direction of the coaxial cable 1. That is, it is not essential that the shield layer 4 is configured in such a manner that all of the adjacent ones of the plurality of metal wires 411, 411, . . . , 411 in the circumferential direction of the coaxial cable 1 are brought into contact with each other, but the shield layer 4 may be configured in such a manner that some of the adjacent ones of the plurality of metal wires 411, 411, . . . , 411 in the circumferential direction of the coaxial cable 1 may be spaced apart from each other and joined with each other with the batch plating portion 42 therebetween. It is desirable that the batch plating portion 42 is provided in such a manner as to batch coat the entire periphery (excluding an inner peripheral portion 4b, which will be described later) of the lateral winding shielding portion 41 together in the circumferential direction and the axial direction of the coaxial cable 1, and mechanically and electrically connect the plurality of metal wires 411, 411, . . . , 411 together.

It is desirable that the shield layer 4 is configured in such a manner that, in at least one part of the lateral winding shielding portion 41, some of the adjacent ones of the plurality of metal wires 411, 411, . . . , 411 in the circumferential direction of the coaxial cable 1 are spaced apart from each other, and the spaced apart parts of the plurality of metal wires 411, 411, . . . , 411 have respective joining portions 43, 43, . . . , 43 thereon, which are joined with each other with the batch plating portion 42 therebetween. By the spaced apart parts of the plurality of metal wires 411, 411, . . . , 411 having the respective joining portions 43, 43, . . . , 43 thereon, the batch plating portion 42 becomes resistant to a crack formation or a peeling off when subjected to a bending or a torsion, as compared with when all of the adjacent ones of the plurality of metal wires 411, 411, . . . , 411 in the circumferential direction of the coaxial cable 1 are brought into contact with each other. That is, the joining portions 43, 43, . . . , 43 in which the spaced apart parts of the plurality of metal wires 411, 411, . . . , 411 are joined with each other by the batch plating portion 42 are configured with only the batch plating portion 42 made of a hot dip plating, which is more flexible than the plurality of metal wires 411, 411, . . . , 411. When subjected to bending or torsion, the batch plating portion 42 in the joining portions 43, 43, . . . , 43 acts to stretch and thereby enhance the flexibility of the entire shield layer 4. This allows the batch plating portion 42 to become resistant to a crack formation or a peeling off when subjected to a bending or a torsion. Note that when the spaced apart distances between the adjacent ones of the plurality of metal wires 411, 411, . . . , 411 in the circumferential direction of the coaxial cable 1 are configured in such a manner that the shortest distance from the surface of one of the adjacent metal wires 411 to the other of the adjacent metal wires 411 is not greater than half the outer diameters of the metal wires 411, 411, . . . , 411, the aforementioned action and effect is easily obtained.

Further, when the thicknesses W along the radial directions of the batch plating portion 42 in the joining portions 43, 43, . . . , 43 (i.e. the minimum straight line distances from the inner surface to the outer surface of the batch plating portion 42 in the joining portions 43, 43, . . . , 43) are configured to be, for example, not smaller than 30% (0.3×d) of the outer diameters (diameters) d of the plurality of metal wires 411, 411, . . . , 411, the batch plating portion 42 becomes resistant to the occurrence of a crack formation. In particular, when the thicknesses W of the batch plating portion 42 in the joining portions 43, 43, . . . , 43 are the same as or larger than the outer diameters (diameters) d of the plurality of metal wires 411, 411, . . . , 411, the joint strengths between the plurality of metal wires 411, 411, . . . , 411 become high, and thereby allow the batch plating portion 42 to become more resistant to the occurrence of a crack formation. Further, in the coaxial cable 1, by the batch plating portion 42 having the joining portions 43, 43, . . . , 43 therein as described above, when the cable assembling is carried out, with the plurality of metal wires 411, 411, . . . , 411, which together constitute the lateral winding shielding portion 41, adhering to the batch plating portion 42, the shield layer 4 is easily removed while being helically wound around along the winding directions of the plurality of metal wires 411, 411, . . . , 411. The upper limit value for the thicknesses W of the batch plating portion 42 in the joining portions 43, 43, . . . , 43 may be, for example, 130% (1.3×d) of the outer diameters d of the plurality of metal wires 411, 411, . . . , 411. Note that the outer diameters d of the plurality of metal wires 411, 411, . . . , 411 are, e.g., 0.02 mm to 0.10 mm. When the plurality of metal wires 411, 411, . . . , 411 have respective plating layers on their surfaces, the outer diameters d of the plurality of metal wires 411, 411, . . . , 411 are defined as the outer diameters including the thicknesses of the respective plating layers. The thicknesses W of the joining portions 43, 43, . . . , 43 and the outer diameters d of the plurality of metal wires 411, 411, . . . , 411 are obtained, for example by using an optical microscope or an electron microscope to observe the transverse cross section of the coaxial cable 1 (the cross section which is perpendicular to the longitudinal direction of the coaxial cable 1).

For example, if the shield layer 4 is configured with only the lateral winding shielding portion 41, a gap formation occurs between the plurality of metal wires 411, 411, . . . , 411, leading to a degradation in the noise property. Further, the influence of the gap formation caused between the plurality of metal wires 411, 411, . . . , 411 leads to a phenomenon called suck-out which refers to a rapid attenuation caused in a predetermined frequency band (e.g., a band of from 10 GHz to 25 GHz). As in the present embodiment, by the batch plating portion 42 made of a hot dip plating being provided in such a manner as to cover the entire respective peripheries (excluding an inner peripheral portion 4b, which will be described later) of the lateral winding shielding portion 41, the batch plating portion 42 is able to close the gap formation caused between the plurality of metal wires 411, 411, . . . , 411, and is therefore able to enhance the shielding effect of the shield layer 4. This allows the shield layer 4 to become resistant to the occurrence of a loss of signal transmission. Further, since the gap formation caused between the plurality of metal wires 411, 411, . . . , 411 is eliminated, the occurrence of the suck-out can be suppressed.

Further, since the batch plating portion 42 made of a hot dip plating is provided in such a manner as to cover the entire respective peripheries (excluding an inner peripheral portion 4b, which will be described later) of the lateral winding shielding portion 41, during the termination working, when the sheath 5 is removed from a terminal portion of the coaxial cable 1 to expose the underlying shield layer 4, the plurality of metal wires 411, 411, . . . , 411 together constituting the shield layer 4 become resistant to being unlaid, and the termination working of the coaxial cable 1 can therefore be facilitated. Furthermore, since the batch plating portion 42 made of a hot dip plating is provided in such a manner as to cover the entire respective peripheries (excluding an inner peripheral portion 4b, which will be described later) of the lateral winding shielding portion 41, the impedance of the coaxial cable 1 can also stably be kept constant in the longitudinal direction of the coaxial cable 1.

As shown in FIG. 1B, the batch plating portion 42 is formed in a corrugated shape along the respective outer shapes of the plurality of metal wires 411, 411, . . . , 411 constituting the lateral winding shielding portion 41. That is, the batch plating portion 42 is of a concave shape in locations in the circumferential direction of the coaxial cable 1, which correspond to the locations between the adjacent ones of the plurality of metal wires 411, 411, . . . , 411 in the circumferential direction of the coaxial cable 1, in other words, in the locations of the joining portions 43, 43, . . . , 43, and the batch plating portion 42 has air gaps 6, 6, . . . , 6 between the concave parts, respectively, of the batch plating portion 42 and the sheath 5. By the batch plating portion 42 having the air gaps 6, 6, . . . , 6 on the joining portions 43, 43, . . . , 43 respectively, when the coaxial cable 1 is bent, the outer surface of the batch plating portion 42 can be stretched in such a manner as to follow that bending and, as a result, the batch plating portion 42 becomes resistant to the occurrence of a crack formation. Further, by the batch plating portion 42 having the air gaps 6, 6, . . . , 6 on the joining portions 43, 43, . . . , 43 respectively, the bendability of the coaxial cable 1 is also enhanced.

In the present embodiment, since the plurality of metal wires 411, 411, . . . , 411 are fixed with the batch plating portion 42, in order to ensure the high bendability of the coaxial cable 1, there is the need to use a metal wire made of a material having a low yield strength that is easily plastically deformed, in the plurality of metal wires 411, 411, . . . , 411. More specifically, a metal wire having a tensile strength of not lower than 200 MPa and not higher than 380 Pa and an elongation of not lower than 7 percent and not higher than 20 percent may be used in the plurality of metal wires 411, 411, . . . , 411.

In the present embodiment, for each of the plurality of metal wires 411, 411, . . . , 411, a silver-plated annealed copper wire having a plating layer 411b made of silver on the periphery of a metal wire 411a made of an annealed copper wire is used. Note that the metal wire 411a to be used in the plurality of metal wires 411, 411, . . . , 411 is not limited to the above annealed copper wire, but that a copper alloy wire, an aluminum wire, an aluminum alloy wire, or a wire rod having a low softening temperature with a trace amount of metal elements (e.g. titanium elements, magnesium elements, or the like) being added to a pure copper therein, or the like, can be used as the metal wire 411a to be used in the plurality of metal wires 411, 411, . . . , 411. Further, the metal for constituting the plating layers 411b, 411b, 411b to be used in the plurality of metal wires 411, 411, ..., 411 is not limited to the above silver, but that, for example, tin or gold may be used in the plating layer 412, or the plating layer 412 can also be omitted. Herein, the lateral winding shielding portion(s) 41 are formed by using 26 of the metal wires 411, 411, ..., 411 made of a silver-plated annealed copper wire having an outer diameter of 0.02 mm.

Further, in the present embodiment, a plating portion made of tin is used in the batch plating portion 42 made of a hot dip plating. It should be noted, however, that the batch plating portion 42 is not limited to the foregoing, but that, for example, a plating portion made of silver, gold, copper, zinc or the like can be used in the batch plating portion 42. It should be noted, however, that, from the point of view of the ease of the production, it can be said that it is more preferable to use the batch plating portion 42 made of tin.

The batch plating portion 42 is formed by the plurality of metal wires 411, 411, ..., 411 being laid together around the periphery of the electrical insulating member 3 to form the lateral winding shielding portion 41, and being subsequently passed through a bath with a molten tin being held therein. That is, the batch plating portion 42 is a hot dip plating layer formed by hot dip plating. In order to facilitate the adhesion of the tin to the respective peripheries of the lateral winding shielding portion 41, it is desirable to apply a flux to the periphery of the lateral winding shielding portion 41 and subsequently pass the flux coated lateral winding shielding portions 41, 41, ..., 41 through the bath with the molten tin being held therein. For the flux to be applied to the periphery of the lateral winding shielding portion 41, it is possible to use, for example, a rosin-based flux or the like. In order to facilitate the batch adhesion of the tin to the entire periphery of the lateral winding shielding portion 41 together, it is desirable to apply the flux to the periphery of the lateral winding shielding portion 41 and subsequently pass the flux coated lateral winding shielding portions 41, 41, ..., 41 through the bath with the tin melted at a temperature of not lower than 250 degrees C. and lower than 300 degrees C. being held therein. The wire velocity at the time of passing the wire rod formed with the lateral winding shielding portion 41 through the bath is, e.g., not lower than 40 m/min and not higher than 80 m/min, and more preferably not lower than 50 m/min and not higher than 70 m/min. As a result, the batch plating portion 42 that batch coats the lateral winding shielding portion 41 together is formed, while at the same time intermetallic compounds 411c, 411c, ..., 411c, which will be described later, are formed between the plurality of metal wires 411, 411, ..., 411 constituting the lateral winding shielding portion 41 respectively and the batch plating portion 42.

In forming the batch plating portion 42, the silver constituting the plating layers 411b, 411b, ..., 411b in the parts of the plurality of metal wires 411, 411, ..., 411 to be brought into contact with the molten tin (in other words, the hot dip plating) is diffused into that molten tin in the bath, and the intermetallic compounds 411c, 411c, ..., 411c including the copper and the tin therein are formed between the plurality of metal wires 411, 411, ..., 411 respectively and the batch plating portion 42 (in other words, in the parts between the metal wires 411a, 411a, ..., 411a for the plurality of metal wires 411, 411, ..., 411 respectively and the batch plating portion 42, and in abutment with the surfaces of the plurality of metal wires 411a, 411a, ..., 411a). As a result of EDX analysis (analysis by energy dispersion type X-ray spectroscopy) using an SEM (scanning electron microscope) made by the present inventors, the intermetallic compounds 411c, 411c, ..., 411c composed of the copper and the tin have been able to be identified as having occurred in the form of a layer on the surfaces of the plurality of metal wires 411, 411, ..., 411 respectively (between the plurality of metal wires 411, 411, ..., 411 respectively and the batch plating portion 42). That is, the intermetallic compounds 411c, 411c, ..., 411c are ones formed with a compound layer on the surfaces of the plurality of metal wires 411, 411, ..., 411 being produced by a metallic diffusion reaction between the metal element (the tin, or the like), which constitutes the batch plating portion 42 made of a hot dip plating, and the metal element (the copper, or the like), which constitutes the primary component of the plurality of metal wires 411, 411, ..., 411. The thicknesses of the layers of the intermetallic compounds 411c, 411c, ..., 411c are on the order of e.g., from 0.2 μm to 1.5 μm. Note that although the silver constituting the plating layers 411b, 411b, 411b of the plurality of metal wires 411, 411, ..., 411 is considered to be included in the intermetallic compounds 411c, 411c, ..., 411c, the silver contents in the intermetallic compounds 411c, 411c, ..., 411c are as low as they are difficult to detect by the EDX analysis. By the shield layer 4 being formed with the intermetallic compounds 411c, 411c, ..., 411c between the plurality of metal wires 411, 411, ..., 411 respectively and the batch plating portion 42, when the coaxial cable 1 is repeatedly subjected to a bending or a torsion, the batch plating portion 42 becomes resistant to the occurrence of a peeling off the surfaces of the plurality of metal wires 411, 411, ..., 411, and becomes resistant to the occurrence of a gap formation between the plurality of metal wires 411, 411, ..., 411 and the batch plating portion 42. As a result, in the coaxial cable 1, even when subjected to a bending or a torsion, the batch plating portion 42 is able to hold the lateral winding shielding portion 41 in a state of being fixed from the outer sides of the lateral winding shielding portions 41, 41, ..., 41, and thereby becomes resistant to the occurrence of a change in the distance between the shield layer 4 and the conductor 2. For that reason, it is possible to make the coaxial cable 1 resistant to the occurrence of a lowering in the shielding effect due to being subjected to a bending or a torsion, and also make the coaxial cable 1 resistant to the occurrence of a rapid attenuation in a predetermined frequency band. The thicknesses of the layers of the intermetallic compounds 411c, 411c, ..., 411c are obtained, for example by using an optical microscope or an electron microscope to observe the transverse cross section of the coaxial cable 1 (the cross section which is perpendicular to the longitudinal direction of the coaxial cable 1).

The plating layers 411b, 411b, ..., 411b made of silver remain on the parts of the plurality of metal wires 411, 411, ..., 411 being not brought into contact with the batch plating portion 42 (i.e., the parts of the plurality of metal wires 411, 411, ..., 411 being not brought into contact with the tin melted during plating). That is, the plating layers 411b, 411b, ..., 411b made of silver remain on the parts of the plurality of metal wires 411, 411, ..., 411 being on the inner side (the electrical insulating member 3 side) in the radial directions of the coaxial cable 1. That is, the shield layer 4 in the coaxial cable 1 according to the present embodiment may be configured in such a manner as to be higher in the electrical conductivity in the inner peripheral portion 4b in which the plurality of metal wires 411, 411, ..., 411 are not being coated with the batch plating portion 42, than in the outer peripheral portion 4a in which the plurality of metal wires 411, 411, ..., 411 are coated with the batch plating portion 42. In the high frequency signal transmission, since the electric current is concentrated in the electrical insulating member 3 side of the shield layer 4, by the plating layers 411b, 411b, ..., 411b, such as silver or the like having a high electrical conductivity, being located in the inner peripheral portion 4b of the shield layer 4, it is possible to suppress the occurrence of lowering in the electrical conductivity of the shield layer 4, and thereby maintain the good attenuation property of the coaxial cable 1. The electrical conductivity of the tin plating constituting the batch plating portion 42 is 15% IACS, while the electrical conductivity of the silver plating constituting the plating layers 411b, 411b, 411b of the plurality of metal wires 411, 411, ..., 411 is 108% IACS.

Note that the outer peripheral portion 4a refers to the portion in which the plurality of metal wires 411, 411, ..., 411 are brought into contact with the plating (tin or the like) melted during hot dip plating (that is, the portion in which the intermetallic compounds 411c, 411c, ..., 411c are formed). The inner peripheral portion 4b refers to the portion in which the plating layers 411b, 411b, 411b made of a silver plating or the like are remaining.

The sheath 5 is configured in such a manner as to be made of, e.g., fluoropolymer resin such as PFA or FEP or the like, polyvinyl chloride, crosslinked polyolefin, or the like. In the present embodiment, the sheath 5 made of fluoropolymer resin is formed by tube extrusion.

(Property Evaluation of the Coaxial Cable 1)

The coaxial cable 1 according to the present embodiment was produced and used as an example, and the property evaluation thereof was made. Further, a coaxial cable of a comparative example was produced which was the same in configuration as the example except that the batch plating portion 42 was omitted, and the property evaluation of the comparative example was made in the same manner as in the example. The lengths of the cables were set at 1 m in both the example and the comparative example. Note that: in the coaxial cable 1 of the example, as the conductor 2, one produced by stranding together seven of the metal wires 21 each made of an annealed copper wire having an outer diameter of 0.02 mm was used; as the electrical insulating member 3, one produced by tube extruding PFA (perfluoro alkoxy alkane) was used; as the lateral winding shielding portion 41, ones produced by helically wrapping the metal wires 411, 411, ..., 411 each having an outer diameter of 0.02 mm and a silver plating on their surfaces around the periphery of the electrical insulating member 3 were used; as the batch plating portion 42, a hot dip plating made of molten tin was used; and as the sheath 5, one made of fluoropolymer resin was used.

First, for the example and the comparative example, the evaluation of the frequency property was made. In the evaluation of the frequency property, the measurement of transmission property S21 was made by using a network analyzer. The measurement range was set at from 10 MHz to 30 GHz, and the output power was set at −8 dBm. The measurement results were shown in FIG. 2 and Table 1.

TABLE 1

| | Shielding layer structure | Insertion loss value (dB) | | |
|---|---|---|---|---|
| | | 7.5 GHz | 15 GHz | 20 GHz |
| Example | Lateral winding shielding portion + batch plating portion | 22.87 | 34.19 | 41.29 |

TABLE 1-continued

| | Shielding layer structure | Insertion loss value (dB) | | |
|---|---|---|---|---|
| | | 7.5 GHz | 15 GHz | 20 GHz |
| Comparative example | Lateral winding shielding portion | 22.61 | 39.67 | 68.56 |

Figure 2:
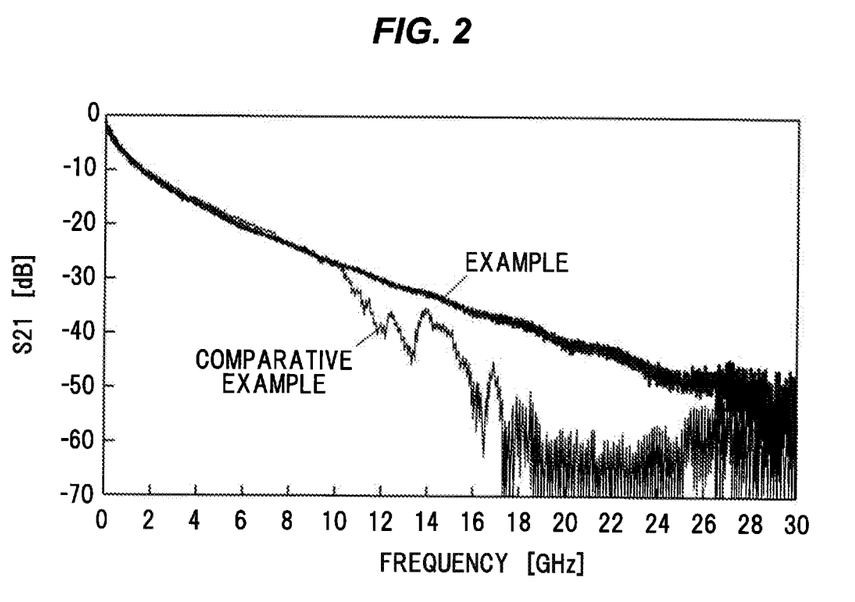
FIG. 2 is a graph showing a result of evaluation of a frequency property.

As shown in FIG. 2 and Table 1, in the coaxial cable 1 of the example, it was able to be confirmed that no rapid attenuation was observed up to 20 GHz or higher (e.g., up to 26 GHz), and that the occurrence of the suck-out was being suppressed. On the other hand, in the coaxial cable of the comparative example, it was able to be seen that the rapid attenuation was occurring in a frequency range of from 12 GHz to 25 GHz, and that the suck-out was occurring.

Next, for the example and the comparative example, the evaluation of the impedance profile was made. In the evaluation of the impedance profile, the reflection property was converted into the time domain by using an ADS (Advanced Design System) linear simulator available from Keysight Technologies, and the analysis of the impedance in the longitudinal direction of the cable was made. The frequency band at the time of the analysis was set at 20 GHz. The analysis results were shown in FIG. 3.

Figure 3:
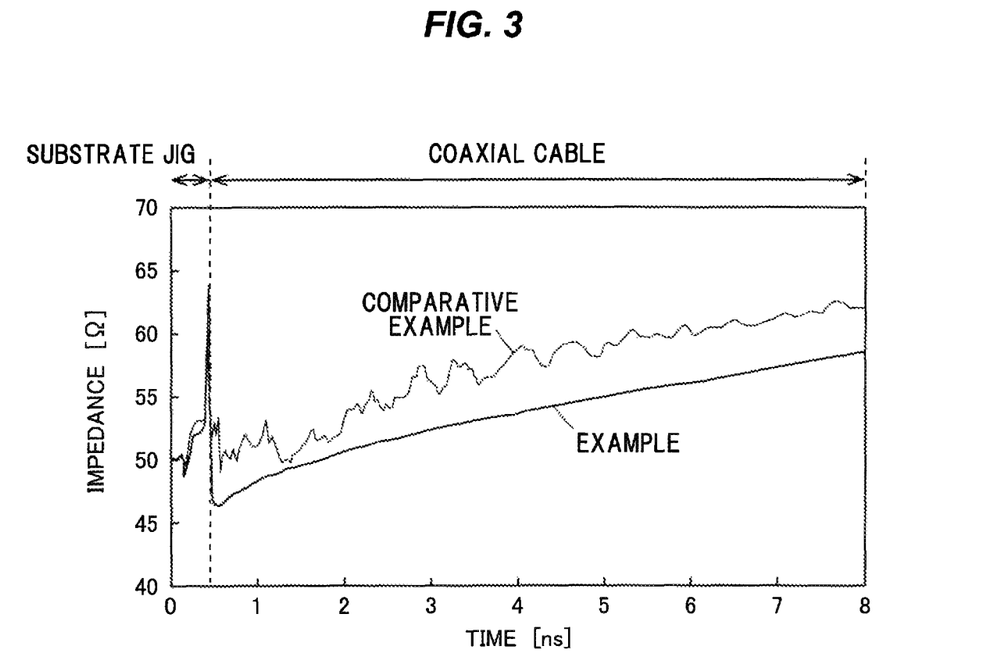
FIG. 3 is a graph showing a result of analysis of an impedance profile.

As shown in FIG. 3, it was able to be seen that in the coaxial cable 1 of the example, the slope of the impedance against the time was stable, and that the fluctuation of the impedance was being suppressed in the longitudinal direction of the cable. On the other hand, in the coaxial cable of the comparative example, it was able to be seen that the slope of the impedance against the time was fluctuating greatly, and that the impedance was fluctuating in the longitudinal direction of the cable.

Next, for the example and the comparative example, the evaluation of the shielding performance was made. In the evaluation of the shielding performance, the measurement of near magnetic field leaking from the coaxial cable 1 was made by using an EMI tester. The frequency range at the time of measurement was set at from 1 MHz to 3 GHz, and the far end side was terminated with 50Ω. The measurement results of the near magnetic field strength at a point at which the near magnetic field strength became maximum were shown in FIG. 4.

Figure 4:
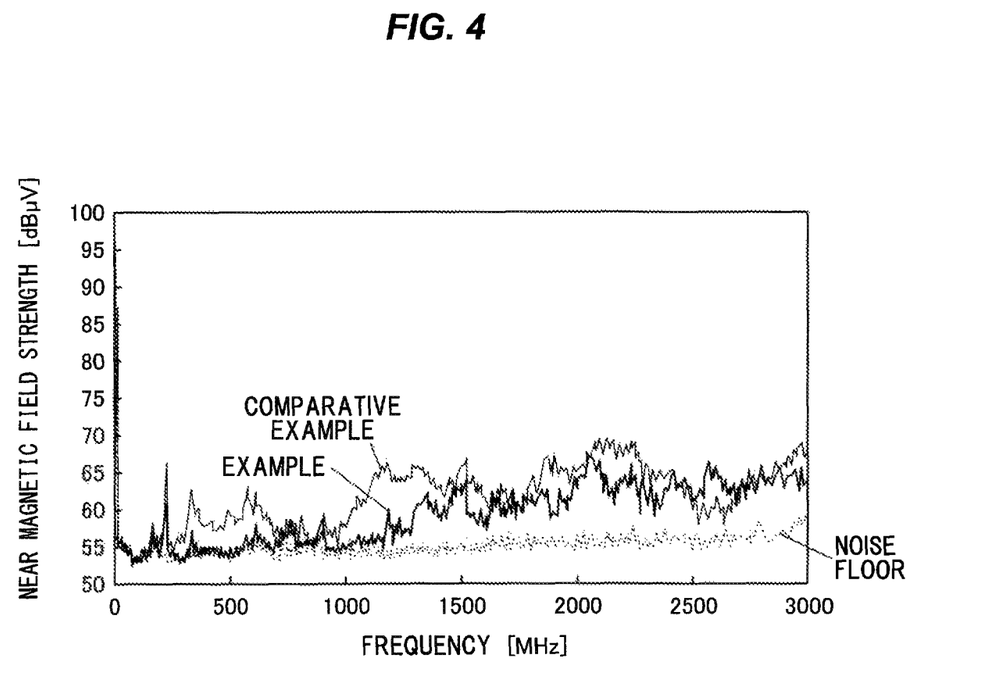
FIG. 4 is a graph showing a result of evaluation of a shielding performance.

As shown in FIG. 4, in the coaxial cable 1 of the example, it was able to be confirmed that the near magnetic field strength was being kept low as compared with the coaxial cable of the comparative example, and that the shielding performance was being enhanced especially in the frequency range of 24 GHz or lower.

(Cable Assembly 10)

Figure 5:
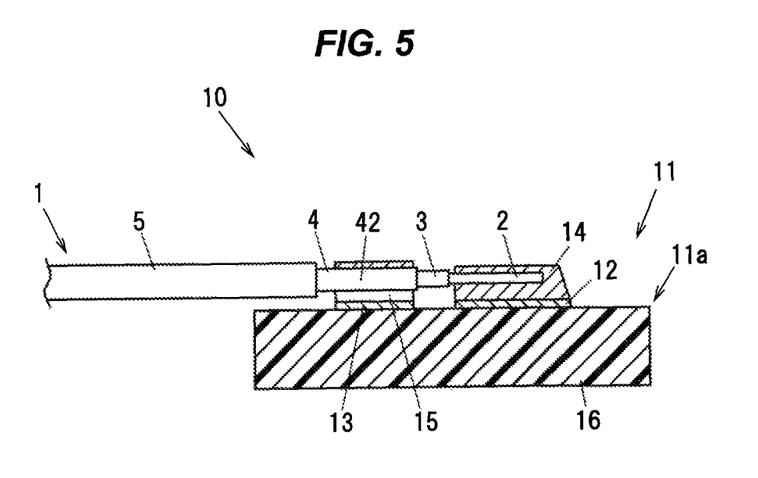
FIG. 5 is a cross-sectional view showing a terminal portion of a cable assembly according to one embodiment of the present invention.

Next, a cable assembly 10 using the coaxial cable 1 will be described. FIG. 5 is a cross-sectional view showing a terminal portion of the cable assembly 10 according to the present embodiment.

As shown in FIG. 5, the cable assembly 10 is including the coaxial cable 1 according to the present embodiment, and a terminal member 11 integrally provided to at least one end portion of the coaxial cable 1.

The terminal member 11 is, for example, a connector, a sensor, a substrate mounted within the connector or the sensor, or a substrate within an electronic device, or the like. In FIG. 5, a case where the terminal member 11 is a substrate 11a is shown. The substrate 11a is formed with a signal electrode 12 thereon, to which the conductor 2 of the coaxial cable 1 is connected, and with a ground electrode 13 thereon, to which the shield layer 4 of the coaxial cable 1 is connected. The substrate 11*a* is made of a printed circuit board in which a conductor pattern including the signal electrode 12 and the ground electrode 13 is printed on a base member 16 made of a resin.

In the terminal portion of the coaxial cable 1, a predetermined length portion of the sheath 5 is removed from the terminal portion of the coaxial cable 1 to expose the underlying shield layer 4, and further a terminal portion of the exposed shield layer 4 and a terminal portion of the electrical insulating member 3 are removed to expose the underlying conductor 2. The exposed conductor 2 of the coaxial cable 1 is fixed to the signal electrode 12 of the substrate 11*a* (the terminal member 11) with a connecting material 14 such as a solder or the like, and the exposed conductor 2 of the coaxial cable 1 is electrically connected to the signal electrode 12 of the substrate 11*a* (the terminal member 11). Further, the exposed shield layer 4 of the coaxial cable 1 is fixed to the ground electrode 13 of the substrate 11*a* (the terminal member 11) with a connecting material 15 such as a solder or the like, and the exposed shield layer 4 of the coaxial cable 1 is electrically connected to the ground electrode 13 of the substrate 11*a* (the terminal member 11). Note that the connecting materials 14 and 15 such as a solder or the like may not be used in the connection of the exposed conductor 2 to the signal electrode 12 of the substrate 11*a* (the terminal member 11) and the connection of the exposed shield layer 4 of the coaxial cable 1 to the ground electrode 13 of the substrate 11*a* (the terminal member 11), but that the terminal portion of the cable assembly 10 may be configured in such a manner that, for example, the exposed conductor 2 and the exposed shield layer 4 of the coaxial cable 1 are fixed to fixing brackets by staking or the like, and thereby are connected to the signal electrode 12 and the ground electrode 13, respectively, of the substrate 11*a* (the terminal member 11). Further, when the terminal member 11 is a connector or a sensor, the terminal portion of the cable assembly 10 may be configured in such a manner that the exposed conductor 2 and the exposed shield layer 4 of the coaxial cable 1 are connected directly to the electrodes or the elements of the connector or the sensor.

(Actions and Advantageous Effects of the Embodiment)

As described above, in the coaxial cable 1 according to the present embodiment, the shield layer 4 is including the lateral winding shielding portion 41, which are formed by the plurality of metal wires 411, 411, . . . , 411 being helically wrapped around the periphery of the electrical insulating member 3, and the batch plating portion 42 made of a hot dip plating, which is covering the respective peripheries of the lateral winding shielding portion 41 together, wherein the shield layer 4 includes the outer peripheral portion 4*a* in which the plurality of metal wires 411, 411, . . . , 411 are coated with the batch plating portion 42, and the inner peripheral portion 4*b* in which the plurality of metal wires 411, 411, . . . , 411 are not being coated with the batch plating portion 42, wherein the outer peripheral portion 4*a* has the intermetallic compounds 411*c*, 411*c*, . . . , 411*c* between the plurality of metal wires 411, 411, . . . , 411 respectively and the batch plating portion 42. At this point of time, it is preferable that the shield layer 4 is configured in such a manner as to be higher in the electrical conductivity in the inner peripheral portion 4*b* in which the plurality of metal wires 411, 411, . . . , 411 are not being coated with the batch plating portion 42, than in the outer peripheral portion 4*a* in which the plurality of metal wires 411, 411, . . . , 411 are joined with each other with the batch plating portion 42 therebetween.

By employing the above configuration, the shield layer 4 becomes continuous in its entire circumference with the batch plating portion 42 therethrough, and the gap formations between the metal wires 411, 411, . . . , 411 of the lateral winding shielding portion 41 can be closed by the batch plating portion 42 and, as a result, it is possible to enhance the noise property and suppress the occurrence of the suck-out. That is, according to the present embodiment, it is possible to achieve the coaxial cable 1 which is resistant to the occurrence of a lowering in the shielding effect, and resistant to the occurrence of a rapid attenuation in a predetermined frequency band (e.g., in a frequency band of up to 26 GHz). Further, since the shield layer 4 becomes continuous in its entire circumference with the batch plating portion 42 therethrough, it is possible to prevent the metal wires 411, 411, . . . , 411 of the lateral winding shielding portion 41 from being unlaid when the sheath 5 is removed in the termination working, which therefore makes it possible to enhance the termination workability, and which therefore makes it possible to suppress the occurrence of a disturbance in the shield layer 4 in the terminal portion of the coaxial cable 1, to thereby enhance the electrical properties of the coaxial cable 1. Furthermore, in the high frequency signal transmission, since the electric current is concentrated in the electrical insulating member 3 side of the shield layer 4, by the shield layer 4 being configured in such a manner as to be higher in the electrical conductivity in the inner peripheral portion 4*b* than in the outer peripheral portion 4*a*, even when the batch plating portion 42 is configured with a metal such as tin or the like having a relatively low electrical conductivity, it is possible to suppress the occurrence of a lowering in the electrical conductivity of the shield layer 4 and thereby maintain the good attenuation property of the coaxial cable 1.

(Modifications)

Figure 6:
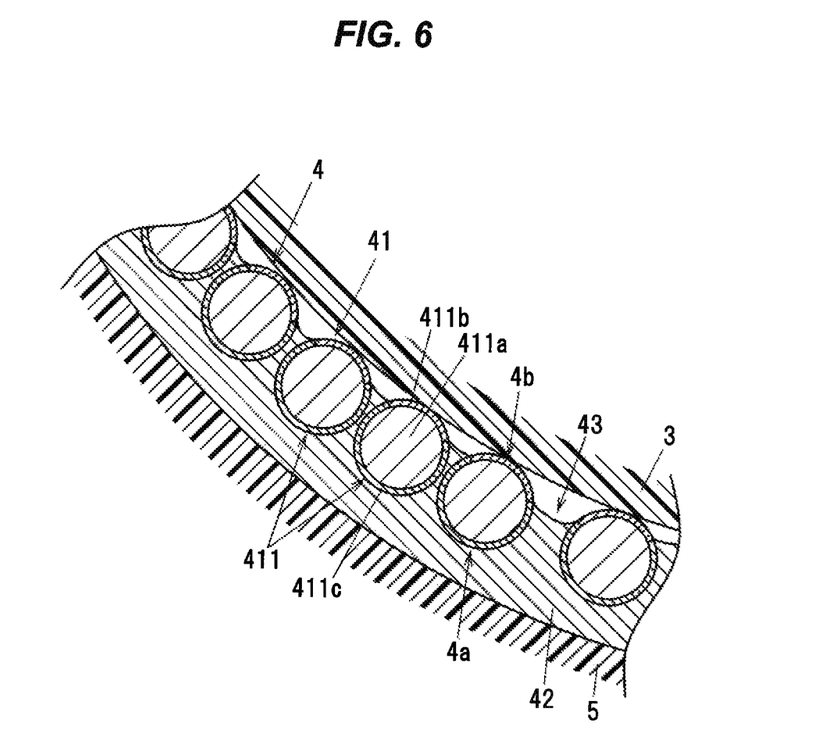
FIG. 6 is an enlarged cross-sectional view of an essential portion of a coaxial cable according to one modification to the present invention.

Although in the above embodiment, there has been described the case where the coaxial cable 1 has the air gaps 6, 6, . . . , 6 formed between the batch plating portion 42 in the joining portions 43, 43, . . . , 43, respectively, and the sheath 5, the coaxial cable 1 may have no air gaps 6, 6, . . . , 6 between the batch plating portion 42 and the sheath 5, but as shown in FIG. 6, the coaxial cable 1 may be configured in such a manner that the outer surface of the batch plating portion 42 and the inner surface of the sheath 5 are in contact with each other with no gap therebetween. At this point of time, the thicknesses W of the batch plating portion 42 in the joining portions 43, 43, . . . , 43 may be configured in such a manner as to be the same as or larger than the outer diameters (diameters) d of the plurality of metal wires 411, 411, . . . , 411. In this case, since sufficient ensuring of the thicknesses of the batch plating portion 42 (in particular, the thicknesses W of the batch plating portion 42 in the joining portions 43, 43, . . . , 43) in a range of not more than 130% (1.3×d) of the outer diameters d of the plurality of metal wires 411, 411, . . . , 411 enables the joint strengths between the plurality of metal wires 411, 411, . . . , 411 to be made high as compared with when the coaxial cable 1 has the air gaps 6, 6, . . . , 6 between the batch plating portion 42 and the sheath 5, it is possible to suppress the occurrence of a crack formation in the shield layer 4. Note that, in this case, as shown in FIG. 6, the batch plating portion 42 may be configured in such a manner that the opposite inner surface of the batch plating portion 42 to the electrical insulating member 3 is concave in shape to the sheath 5 side between the adjacent ones of the plurality of metal wires 411, 411, . . . , 411 in the circumferential direction of the coaxial cable 1 (for example, in the locations of the joining portions 43, 43, ..., 43 between the adjacent ones of the plurality of metal wires 411, 411, ..., 411 in the circumferential direction of the coaxial cable 1).

Figure 7:
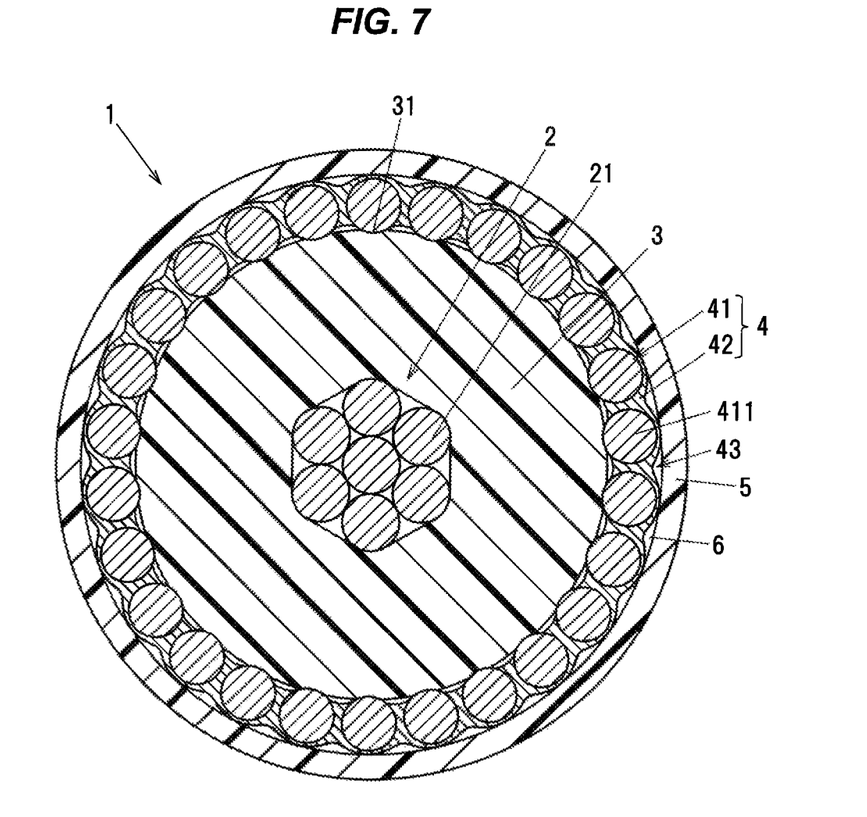
FIG. 7 is a cross-sectional view showing a cross section perpendicular to a longitudinal direction of a coaxial cable according to one modification to the present invention.

Further, as shown in FIG. 7, the coaxial cable 1 may be configured in such a manner that the plurality of metal wires 411, 411, ..., 411 are arranged by being embedded in the electrical insulating member 3. In this case, the electrical insulating member 3 is configured in such a manner as to include indentations 31, 31, ..., 31 on parts of its surface to be brought into contact with the plurality of metal wires 411, 411, ..., 411, respectively. Further, the shield layer 4 is configured in such a manner that its parts in the respective circumferential directions of its plurality of metal wires 411, 411, ..., 411 being brought into contact with the electrical insulating member 3 are mated to the above mentioned indentations 31, 31, ..., 31, respectively, on that electrical insulating member 3. This renders the plurality of metal wires 411, 411, ..., 411 fixed to the electrical insulating member 3, and therefore allows the gaps between the adjacent ones of the plurality of metal wires 411, 411, ..., 411 to become resistant to being widened. This allows the coaxial cable 1 to become more resistant to the occurrence of a crack formation in the batch plating portion 42 when bent, and therefore makes it possible to further enhance the bending resistance of the coaxial cable 1. In addition, since the plurality of metal wires 411, 411, ..., 411 are embedded in the electrical insulating member 3, during the termination working of the coaxial cable 1, the plurality of metal wires 411, 411, ..., 411 become more resistant to being unlaid, and the termination working of the coaxial cable 1 can therefore be further facilitated. Furthermore, since the plurality of metal wires 411, 411, ..., 411 are brought into close contact with the electrical insulating member 3, the distance between the conductor 2 and the shield layer 4 can be kept constant in the longitudinal direction of the coaxial cable 1, and also it is therefore possible to stably keep the impedance of the coaxial cable 1 constant in the longitudinal direction of the coaxial cable 1, and to render the coaxial cable 1 resistant to the occurrence of a rapid attenuation in a predetermined frequency band (for example, in a frequency band of up to 26 GHz).

Summary of the Embodiment

Next, the technical ideas grasped from the aforementioned embodiments will be described with the aid of the reference characters and the like in the embodiments. It should be noted, however, that each of the reference characters and the like in the following descriptions is not to be construed as limiting the constituent elements in the appended claims to the members and the like specifically shown in the embodiments.

[1] A coaxial cable (1), comprising: a conductor (2); an electrical insulating member (3) covering a periphery of the conductor (2); a shield layer (4) covering a periphery of the electrical insulating member (3); and a sheath (5) covering a periphery of the shield layer (4), wherein the shield layer (4) includes a lateral winding shielding portion (41) comprising a plurality of metal wires (411, 411, ..., 411) being helically wrapped around the periphery of the electrical insulating member (3) in such a manner as to cover the periphery of the electrical insulating member (3), and a batch plating portion (42) comprising a hot dip plating, which is covering a periphery of the lateral winding shielding portion (41), wherein the shield layer (4) includes an outer peripheral portion (4a), in which the plurality of metal wires (411, 411, ..., 411) are covered with the batch plating portion (42), and an inner peripheral portion (4b), in which the plurality of metal wires (411, 411, ..., 411) are not being covered with the batch plating portion (42), wherein the outer peripheral portion (4a) of the shield layer (4) includes an intermetallic compound (411c) between the plurality of metal wires (411, 411, ..., 411) and the batch plating portion (42).

[2] The coaxial cable (1) as defined in the above [1], wherein the shield layer (4) is configured in such a manner as to be higher in electrical conductivity in the inner peripheral portion (4b), than in the outer peripheral portion (4a).

[3] The coaxial cable (1) as defined in the above [1] or [2], wherein the shield layer (4) is configured in such a manner that adjacent ones of the plurality of metal wires (411, 411, ..., 411) in a circumferential direction of the coaxial cable (1) are spaced apart from each other, and the spaced apart plurality of metal wires (411, 411, ..., 411) are joined with each other via the batch plating portion (42).

[4] The coaxial cable (1) as defined in any one of the above [1] to [3], wherein the batch plating portion (42) comprises tin, while each of the plurality of metal wires (411, 411, ..., 411) comprises a silver-plated annealed copper wire, and the intermetallic compound (411c) including copper and tin is formed between the plurality of metal wires (411, 411, ..., 411) and the batch plating portion (42).

[5] The coaxial cable (1) as defined in any one of the above [1] to [4], wherein each of the plurality of metal wires (411, 411, ..., 411) comprises a tensile strength of not lower than 200 MPa and not higher than 380 Pa, and an elongation of not lower than 7 percent and not higher than 20 percent.

[6] A cable assembly (10), comprising: the coaxial cable (1) as defined in any one of the above [1] to [5]; and a terminal member integrally provided to at least one end portion of the coaxial cable (1).

Although the embodiments of the present invention have been described above, the aforementioned embodiments are not to be construed as limiting the inventions according to the appended claims. Further, it should be noted that not all the combinations of the features described in the embodiments are indispensable to the means for solving the problem of the invention. Further, the present invention can be appropriately modified and implemented without departing from the spirit thereof.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A coaxial cable, comprising:
a conductor;
an electrical insulating member covering a periphery of the conductor;
a shield layer covering a periphery of the electrical insulating member; and
a sheath covering a periphery of the shield layer,
wherein the shield layer includes a lateral winding shielding portion comprising a plurality of metal wires being helically wrapped around the periphery of the electrical insulating member in such a manner as to cover the periphery of the electrical insulating member, and a batch plating portion comprising a hot dip plating, which is covering a periphery of the lateral winding shielding portion,
wherein the shield layer includes an outer peripheral portion, in which the plurality of metal wires are covered with the batch plating portion, and an inner peripheral portion, in which the plurality of metal wires are not covered with the batch plating portion, wherein the outer peripheral portion of the shield layer includes an intermetallic compound between the plurality of metal wires and the batch plating portion, and wherein the shield layer is configured in such a manner as to be higher in electrical conductivity in the inner peripheral portion, than in the outer peripheral portion.

2. A coaxial cable, comprising:

a conductor;

an electrical insulating member covering a periphery of the conductor;

a shield layer covering a periphery of the electrical insulating member; and a sheath covering a periphery of the shield layer, wherein the shield layer includes a lateral winding shielding portion comprising a plurality of metal wires being helically wrapped around the periphery of the electrical insulating member in such a manner as to cover the periphery of the electrical insulating member, and a batch plating portion comprising a hot dip plating, which is covering a periphery of the lateral winding shielding portion, wherein the shield layer includes an outer peripheral portion, in which the plurality of metal wires are covered with the batch plating portion, and an inner peripheral portion, in which the plurality of metal wires are not covered with the batch plating portion, wherein the outer peripheral portion of the shield layer includes an intermetallic compound between the plurality of metal wires and the batch plating portion, and wherein the shield layer is configured in such a manner that adjacent ones of the plurality of metal wires in a circumferential direction of the coaxial cable are spaced apart from each other, and the spaced apart plurality of metal wires are joined with each other via the batch plating portion.

3. A coaxial cable, comprising:

a conductor;

an electrical insulating member covering a periphery of the conductor;

a shield layer covering a periphery of the electrical insulating member; and a sheath covering a periphery of the shield layer, wherein the shield layer includes a lateral winding shielding portion comprising a plurality of metal wires being helically wrapped around the periphery of the electrical insulating member in such a manner as to cover the periphery of the electrical insulating member, and a batch plating portion comprising a hot dip plating, which is covering a periphery of the lateral winding shielding portion, wherein the shield layer includes an outer peripheral portion, in which the plurality of metal wires are covered with the batch plating portion, and an inner peripheral portion, in which the plurality of metal wires are not covered with the batch plating portion, wherein the outer peripheral portion of the shield layer includes an intermetallic compound between the plurality of metal wires and the batch plating portion, and wherein each of the plurality of metal wires comprises a tensile strength of not lower than 200 MPa and not higher than 380 MPa, and an elongation of not lower than 7 percent and not higher than 20 percent.

4. A cable assembly, comprising:

a coaxial cable comprising:

a conductor;

an electrical insulating member covering a periphery of the conductor;

a shield layer covering a periphery of the electrical insulating member; and a sheath covering a periphery of the shield layer, wherein the shield layer includes a lateral winding shielding portion comprising a plurality of metal wires being helically wrapped around the periphery of the electrical insulating member in such a manner as to cover the periphery of the electrical insulating member, and a batch plating portion comprising a hot dip plating, which is covering a periphery of the lateral winding shielding portion, wherein the shield layer includes an outer peripheral portion, in which the plurality of metal wires are covered with the batch plating portion, and an inner peripheral portion, in which the plurality of metal wires are not covered with the batch plating portion, wherein the outer peripheral portion of the shield layer includes an intermetallic compound between the plurality of metal wires and the batch plating portion; and a terminal member integrally provided to at least one end portion of the coaxial cable.

5. A coaxial cable, comprising:

a conductor;

an electrical insulating member covering a periphery of the conductor; and a shield layer covering a periphery of the electrical insulating member; and wherein the shield layer includes a lateral winding shielding portion comprising a plurality of metal wires being helically wrapped around the periphery of the electrical insulating member in such a manner as to cover the periphery of the electrical insulating member, and a batch plating portion comprising a hot dip plating, which is covering a periphery of the lateral winding shielding portion, wherein the shield layer includes an outer peripheral portion, in which the plurality of metal wires are covered with the batch plating portion, and an inner peripheral portion, in which the plurality of metal wires are not covered with the batch plating portion, wherein the outer peripheral portion of the shield layer includes an intermetallic compound between the plurality of metal wires and the batch plating portion, and wherein the shield layer is configured in such a manner that adjacent ones of the plurality of metal wires in a circumferential direction of the coaxial cable are spaced apart from each other, and the spaced apart plurality of metal wires are joined with each other via the batch plating portion.

* * * * *